United States Patent [19]

Kaschmitter et al.

[11] Patent Number: 5,529,971
[45] Date of Patent: Jun. 25, 1996

[54] CARBON FOAMS FOR ENERGY STORAGE DEVICES

[75] Inventors: James L. Kaschmitter, Pleasanton; Steven T. Mayer, San Leandro; Richard W. Pekala, Pleasant Hill, all of Calif.

[73] Assignee: Regents of The University of California, Oakland, Calif.

[21] Appl. No.: 36,740

[22] Filed: Mar. 25, 1993

Related U.S. Application Data

[63] Continuation of Ser. No. 822,438, Jan. 17, 1992, Pat. No. 5,260,855.

[51] Int. Cl.$^6$ ............................. B01J 20/02; C01B 31/00
[52] U.S. Cl. .................... 502/416; 502/418; 502/437; 502/180; 502/182
[58] Field of Search .................... 502/180, 182, 502/402, 416, 418, 437; 423/445 R; 264/29.1, 29.7

[56] References Cited

U.S. PATENT DOCUMENTS

| | | | |
|---|---|---|---|
| 4,806,290 | 2/1989 | Hopper et al. | 502/182 |
| 4,832,881 | 5/1989 | Arhold, Jr. et al. | 423/445 |
| 4,873,218 | 10/1989 | Pekala | 502/418 |
| 4,992,254 | 2/1991 | Kong | 502/418 |
| 4,997,804 | 3/1991 | Pekala | 502/416 |
| 5,208,003 | 5/1993 | Simandl et al. | 423/445 |
| 5,260,855 | 11/1993 | Kaschmitter et al. | 502/418 |

OTHER PUBLICATIONS

Pekala et al.—"Resorcihol–Formaldehyde Aerogels and Their Carbonized Derivatives"—*American Chemical Society Polymer Preprints*—Dallas, Tex.—Apr. 9–14, 1989.

*Primary Examiner*—E. Rollins Cross
*Assistant Examiner*—Walter D. Griffin
*Attorney, Agent, or Firm*—Henry P. Sartorio; L. E. Carnahan

[57] ABSTRACT

A high energy density capacitor incorporating a variety of carbon foam electrodes is described. The foams, derived from the pyrolysis of resorcinol-formaldehyde and related polymers, are high density (0.1 g/cc–1.0 g/cc) electrically conductive and have high surface areas (400 $m^2$/g–1000 $m^2$/g). Capacitances on the order of several tens of farad per gram of electrode are achieved.

7 Claims, 4 Drawing Sheets

CARBON FOAMS FOR ENERGY STORAGE DEVICES

The United States Government has rights in this invention pursuant to Contract Number W-7405-ENG-48 of the U.S. Dept. of Energy and the University of California for the operation of the Lawrence Livermore National Laboratory.

This is a continuation of U.S. application Ser. No. 07/822,438 filed Jan. 17, 1992, now U.S. Pat. No. 5,260,855 issued Nov. 9, 1993.

BACKGROUND OF THE INVENTION

1. Field of the Invention

This invention relates to an electrolytic integrated capacitor device. More particularly, the present invention relates to the preparation of an electrolytic double layer capacitor capable of delivering very high specific power and very high energy density. Most particularly, the present invention relates to the use of high density carbon aerogel electrodes in a double layer capacitor.

2. Description of the Related Art

As disclosed in Volume 1 of the conference proceedings of "An International Seminar on Double Layer Capacitors and Similar Energy Storage Devices", Dec. 9–11, 1991, Deerfield Beach, Fla., double layer capacitors are well known energy storage devices.

Low density organic aerogels have known applications in high energy physics, chemical catalysis and ion exchange reactions. U.S. Pat. Nos. 4,806,290, 4,873,218 and 4,997,804 illustrate the preparation of such aerogels.

The need exists for an electrode material with desirable physical and chemical properties to enhance the energy storage and dissipation from capacitor devices. In particular, sufficiently high density, porous, electrochemically and dimensionally stable materials of known composition are necessary.

SUMMARY OF THE INVENTION

A general purpose of the present invention is to provide a capacitor capable of achieving very high energy density.

An advantage of the present invention is that it obtains a capacitor having increased specific capacitance as compared with conventional capacitor.

In one aspect of the present invention, a process for preparing high density carbon foams from organic gels is described. According to this process, several forms of the foams may be produced, including aerogels, xerogels and aerogel-xerogel hybrids. The foams are high density, electrically conductive, dimensionally stable and machinate.

In another aspect, the present invention provides a double layer capacitor utilizing a variety of forms of carbon foam electrodes. The electrodes are formed from machinable, structurally stable carbon foams derived from the pyrolysis of organic foams. Integration to form the capacitor is achieved using lightweight components that help minimize internal resistance and maximize energy.

BRIEF DESCRIPTION OF THE DRAWINGS

The invention will be better understood by reference to the figures of the drawings wherein like numbers denote like parts throughout and wherein.

DESCRIPTION OF THE PREFERRED EMBODIMENTS

Described herein is a high energy double layer capacitor that incorporates electrodes based on carbon foams. Also described are carbon aerogels having novel physical and chemical properties suitable for use as electrodes in such a capacitor. Finally, a process for manufacturing high density carbon aerogels is described.

Component Fabrication and Integration

A capacitor according to the present invention has two or more conductors between which a potential difference exists. The conductors are separated by an electrically insulating material. In a typical capacitor, the conductors are electrically connected with an external power supply and are known as electrodes.

Figure 1A:
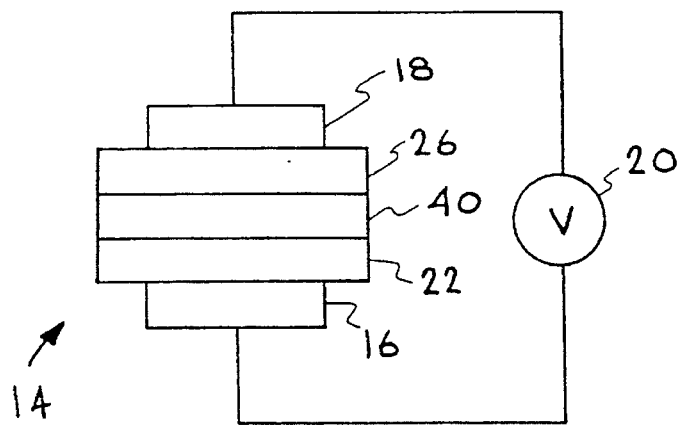
FIG. 1A illustrates schematically a capacitor with carbon aerogel electrodes.

As shown schematically in FIG. 1A, capacitor 14 is made up of a pair of spaced electrodes 22, 26, made of carbon aerogel, separated by electrode separator 40. Electrical contacts 16, 18 to electrodes 22, 26 respectively, provide electrical connection to voltage source 20.

The supercapacitor according to the present invention can be assembled from a variety of elements. The preferred embodiments incorporate, in various combinations, electrodes, electrical contacts to a power supply, cell and/or electrode separators, environmental seals, and an electrolyte. In general, the elements are desirably lightweight and chemically stable with respect to the electrolyte used within the supercapacitor. The following discussion describes the elements and construction of supercapacitors that employ carbon aerogels as the electrodes. However, a supercapacitor based on xerogel or xerogel/aerogel hybrids, described below, is also considered to be within the scope of this invention.

For conventional double layer capacitors, capacitances are practically measured in terms of pico- or micro-farads (pF or µF, respectively). According to the present invention, in an integrated device capable of delivering very high specific capacitance, i.e., energy, and very high power, referred to here as a supercapacitor, capacitances on the order of tens of farads/gram of aerogel are possible. In particular, by incorporation of lightweight materials, thin film contacts and carbon aerogel electrodes, a supercapacitor capable of very high energy densities is possible.

Figure 1B:
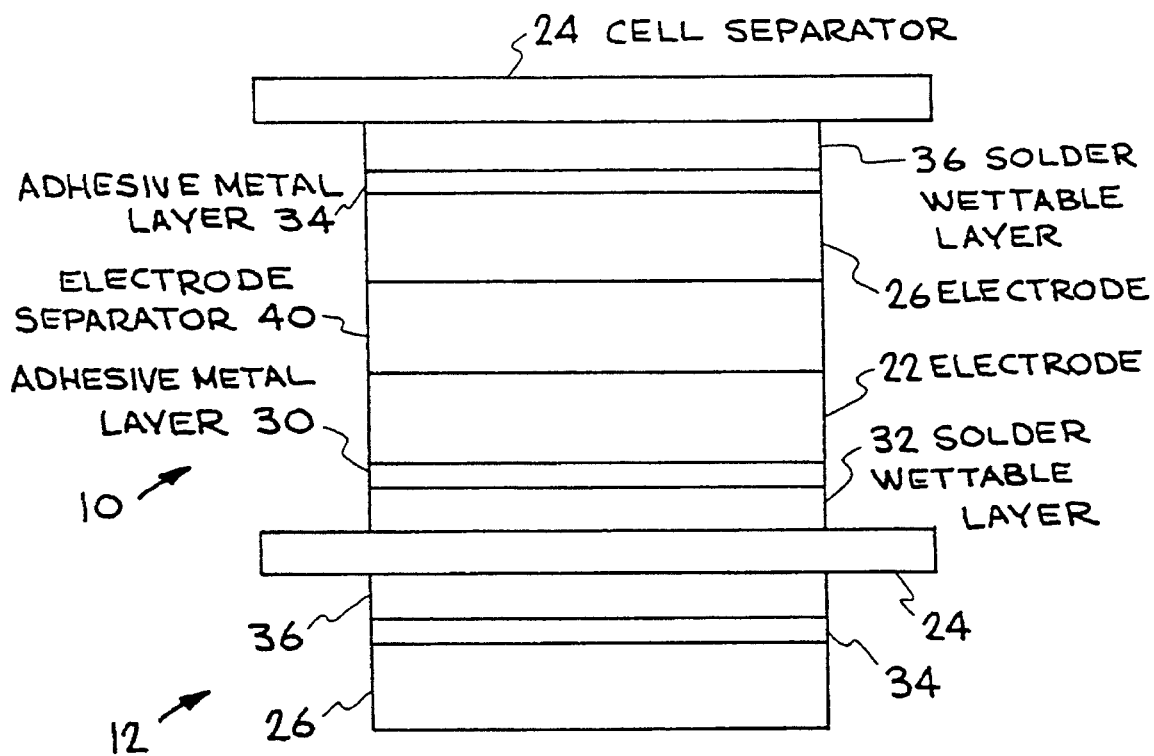
FIG. 1B illustrates structural details of a capacitor having carbon aerogel electrodes according to the present invention.
Figure 2A:
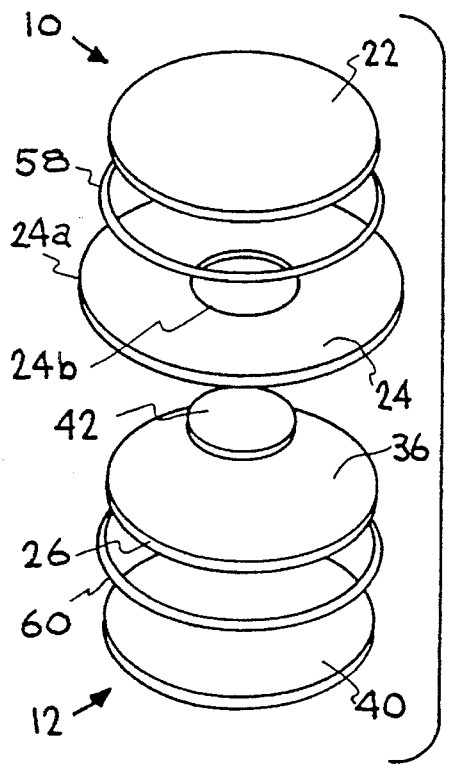
FIGS. 2A and 2B illustrate a multicell configuration of a capacitor according to the present invention.

A simple cell 10 consisting of two electrodes and an electrode separator is shown in FIGS. 1B and 2A, discussed in detail below.

Electrodes

Figure 3:
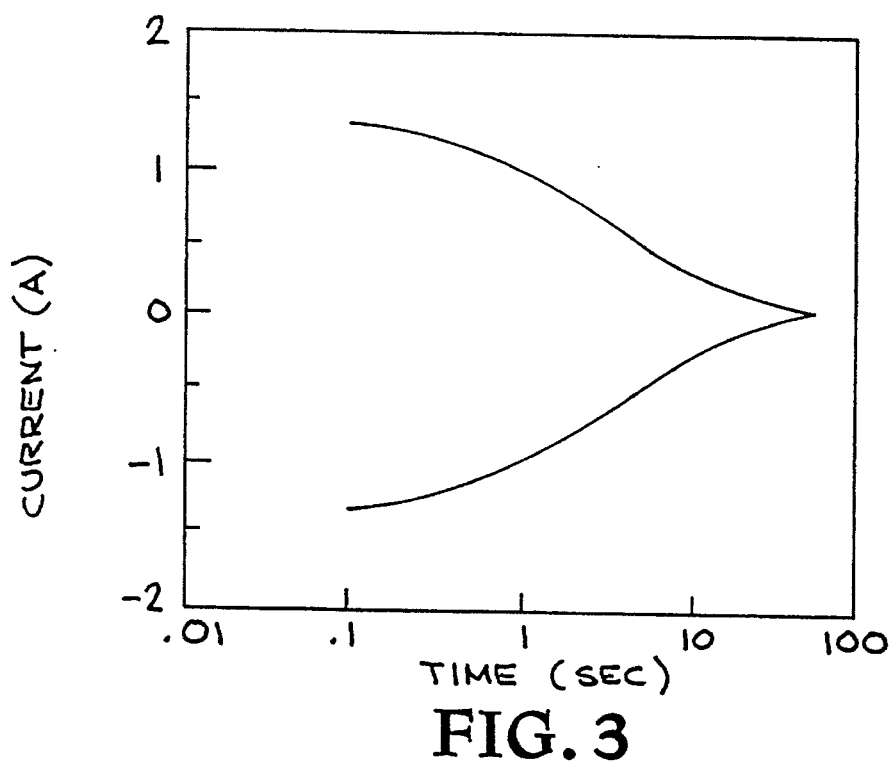
FIG. 3 illustrates the charge/discharge characteristics in an inorganic electrolyte for aerogel electrodes according to the present invention.
Figure 4:
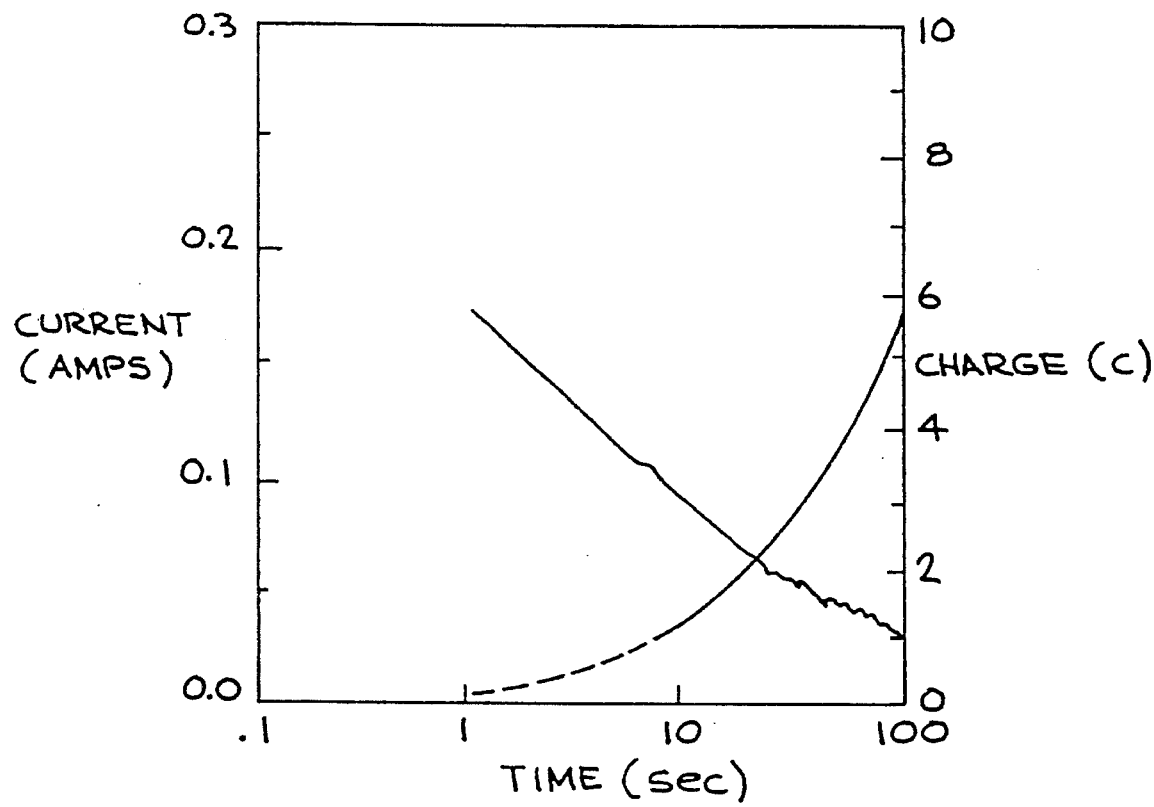
FIG. 4 illustrates the charge/discharge characteristics in an organic electrolyte for aerogel electrodes according to the present invention.

The electrodes of the supercapacitor are desirably carbon aerogels. Compared to materials used in conventional electrodes, the aerogels are very lightweight, having densities between about 0.3–0.9 g/cc, and have high surface areas, about 400–1000 $m^2/g$. More generally, the densities are about 0.2–1.2 g/cc and surface areas are about 100–1200 $m^2/g$. These characteristics of the aerogel contribute minimally to the weight of the supercapacitor and, taken together with the aerogel's electrochemical properties, optimize its capacitance. FIGS. 3 and 4 illustrate the charge/discharge characteristics of a carbon aerogel having a R/C value of 50. In FIG. 3, aerogel samples 0.15 cm thick wish surface areas of 1.58 $cm^2$ in an inorganic electrolyte were charged to 1.0 volts and discharged through a 500 milliohm resistor. The symmetry between the charging (upper curve) and discharging (lower curve) cycles indicates a high degree of reversibility of the device and its potentially long life.

Other physical characteristics of the aerogels permit creation of very thin electrodes by conventional methods, with thicknesses ranging from fractions of a micron ($\mu m$) to several millimeters (mm). The preferred thickness of each aerogel electrode is between about 125 $\mu m$ and 2 mm. The electrodes may be formed by slicing the gels before or after solvent extraction followed by pyrolysis. Alternatively, these thin electrodes may be formed from the aerogel in several ways. In one method, thin layers with thicknesses greater than the desired thickness of the electrode can be sliced from an organic aerogel monolith before the pyrolysis procedure. Since some shrinkage occurs during pyrolysis, very thin carbon aerogel electrodes can be formed by subjecting these thin layers of the organic aerogel to the pyrolysis procedure. Another method involves slicing the thin layers after the carbon aerogel monoliths have been formed. In a preferred embodiment, disk-like electrodes are formed.

The electrodes may also be formed from a lamination of gel layers, for example, as in a xerogel-aerogel hybrid consisting of a xerogel layer and an aerogel layer joined together. An alternative configuration of a xerogel-aerogel hybrid is based on alterations of the procedure to form a single gel which has characteristics of both a xerogel and an aerogel.

Specific details about aerogel electrodes are discussed below in connection with FIG. 1B.

Figure 5:
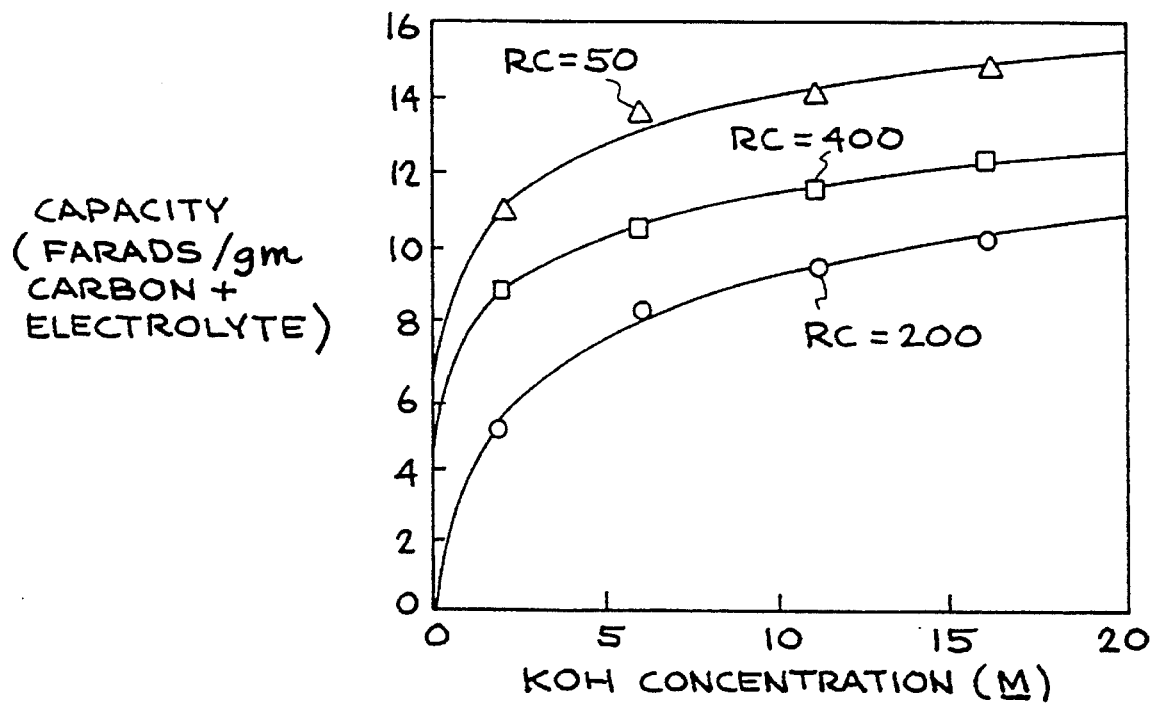
FIG. 5 illustrates the variation in capacity of capacitors incorporating carbon aerogels according to the present invention with changes in composition of the aerogel.

In addition, the capacitance of a supercapacitor according to the present invention also depends on the composition of the aerogel being used as an electrode. FIG. 5 illustrates the capacitance of supercapacitors incorporating electrodes composed of one of three carbon aerogel formulations in various potassium hydroxide electrolyte solutions. The R/C values of these aerogels were 50, 200, and 400. The highest capacitance was observed for aerogels having an R/C value of 50. For each aerogel formulation, capacitance increased with increasing electrolyte concentration. The rate of increase was steepest for the 0–5 M range of electrolyte concentration.

Electrode Surface Modifications

For certain applications, surface modification procedures may be incorporated into the above-described aerogel preparation process. For example, the energy storage capability of the aerogel when used as an electrode can be increased. By binding, at the carbon matrix surface of the electrode, electroactive groups that can be reversibly reduced and oxidized, the energy storage capability of a capacitor may be increased. Such an increase in energy storage capability or capacity is referred to here as "pseudo-capacity", distinct from electrolytic double layer capacity. The latter terms refer to the capacitance, in a double layer, at the interfacial region, associated with charge accumulation at the interface of each electrode's carbon matrix with the electrolyte solution, and the subsequent charge separation of the ions of which the electrolyte is composed.

The term pseudo-capacity, on the other hand, refers to the capacitance associated with the attachment of surface groups, e.g., hydroquinone, that bear oxidizable or reducible components to the carbon matrix surface. Application of a potential through the electrolyte changes the oxidation state of the surface groups. For a given electrode/electrolyte system, this capacitance is in addition to double electrolytic layer capacitance. When the electrodes are composed of aerogels having particularly high surface areas, such as those according to the present invention, an electrochemical "formatting" step may be useful to ensure the stability of an organic electrolyte. At high voltages, the electrolyte can slowly decompose, causing the capacitor to "dry out" as the amount of electrolyte decreases. Decomposition of this type can be reduced by a careful charging/discharging procedure. One useful procedure involves the cycling of the electrode between zero volts and progressively higher potentials and then discharging the capacitor, while at the same time monitoring the charge efficiency. During this procedure, a uniform, nonporous overlayer, itself a decomposition product, is believed to form on the carbon matrix surface at the interface with the electrolyte, inhibiting further breakdown of the electrolyte. The cycling procedure is continued until the charge efficiency approaches unity. As a result of this procedure, the interfacial surface is said to be 'formatted'. During the cycling process, it is believed that a nonaggressive or slow ramp to the higher potentials promotes uniform film formation at the interface.

Using a propylene carbonate/sodium borotetrafluoride electrolyte system as an example, the decomposition involves the liberation of propene gas and the formation of sodium carbonate. As a result of the cycling procedure, a sufficiently thick and uniform overlayer of sodium carbonate forms at the carbon matrix-electrolyte interface in about 10 charge-discharge cycles to inhibit the subsequent decomposition of the electrolyte.

Electrical Contacts

Electrical contacts from the electrodes to an external power supply may be provided in several ways. Specific embodiments are discussed below in connection with FIGS. 1B and 2B.

Separators

The supercapacitor may include either or both of two types of separators. An electrode separator 40 electrically insulates adjacent electrodes within individual capacitor cells from nonionic conduction of electricity. A cell separator 24 provides ionic insulation between individual cells. The separators are discussed in greater detail below in connection with FIGS. 1B and 2A.

Environmental Seal

Figure 2B:
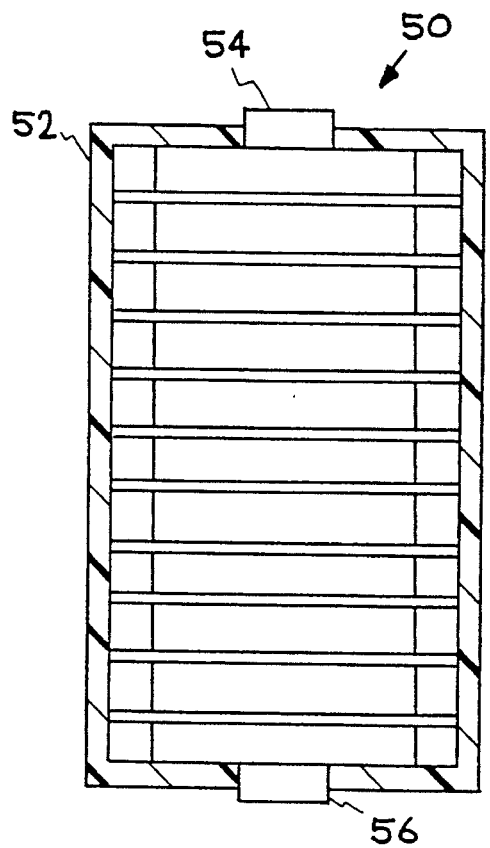

To isolate the internal environment of the supercapacitor from ambient conditions, the individual cells may be enclosed singly or in groups within an environmental seal 52, as illustrated in FIG. 2B.

Electrolyte

The primary requirements of electrolytes used in supercapacitors according to the present invention are 1) chemical stability; 2) low density (generally less than 2 g/cc); 3) relatively low viscosity (less than 4 cp); 4) liquid over a reasonable range of temperature near ambient conditions; 5) commercially inexpensive; 6) environmentally safe; and 7) compatibility with carbon. Some examples of inorganic electrolytes which may be used include water, ammonia, sulfur dioxide, phosphoryl chloride, thionyl chloride, sulfuryl chloride and mixtures of these electrolytes. Examples of organic electrolytes which may be used include propylene carbonate, ethylene carbonate, methylformate, dimethylsulfoxide, ethylene glycol sulfite, acetonitrile, tetrahydrofuran, 1,2-dimethoxyethane and mixtures of these electrolytes. Generally, organic electrolytes allow for voltage increases about 3 times that for a water-based system but lower power by about an order of magnitude.

Because power and energy of an electrochemical capacitor both increase to some extent with increased dissolved ion concentration within the electrolyte, it is desirable to have electrolytes which can dissolve large amounts of ionic salts. Depending on the electrolyte, a large amount of ionic salt can be greater than about 0.1 M to 16 M. Additionally, it is important that the ionic salt is stable, that is, is a nonreducible, nonoxidizable salt that is electrochemically stable with respect to the electrolyte. This requirement means that the salt has a reduction voltage below the electrolyte reduction potential and oxidation voltage above the electrolyte oxidation potential. A mixed ionic salt or a salt mixed with an acid or a base may be introduced into the electrolyte to optimize both power and energy density in the supercapacitor. Examples include aqueous-based systems where dissolved acids or bases such as sulfuric, hydrochloric, nitric or phosphoric acids, or hydroxides of potassium, sodium, or lithium, respectively.

Integration

The method by which a supercapacitor may be integrated to incorporate the above-described elements generally involves constructing one or more individual capacitor cells in series, establishing electrical contact between the cells and to the power supply, injecting the electrolyte into the cell, and sealing the cells. The goals of the integration are to establish and maintain electrical and/or ionic conduction processes necessary for proper and sustained operation of the supercapacitor, incorporate components with minimal contributions to the internal resistance of the supercapacitor and thereby help optimize its power, and help prolong the life of the supercapacitor.

Once the electrodes are formed from the aerogel as described in detail below, an electrical contact to the power supply is provided on one side of each electrode. In a preferred embodiment, one side of an aerogel electrode is compression sealed against a nonporous metal or carbon sheet acting as a current collector. The seal between the electrode and the metal or carbon sheet is formed as a result of the application of pressure.

FIG. 1B illustrates an alternative embodiment for establishing electrical contact between portions of two adjacent cells 10, 12. In the upper cell 10, a solder-wettable layer 32 and an adhesive metal layer 30 overlie an electrode 22. An electrode separator 40 lies between electrode 22 of the upper cell 10 and electrode 26 of the upper cell 10. Solder-wettable layer 36 and adhesive layer 34 overlie electrode 26. A similar electrode 26 is shown in lower cell 12, with adhesive layer 34 and solder-wettable layer 36 formed thereon. A cell separator 24 lies between electrode 22 of cell 10 and electrode 26 of cell 12.

Metal layers 30, 34 may be deposited according to conventional methods such as sputtering, vapor deposition, and electroplating methods. The thickness of the adhesion metal layers should be greater than the maximum pore size of the aerogel to prevent ionic conduction across the aerogel of the electrolyte through the pores. Typically, thicknesses of 500 Å are adequate. The metals should be chemically inert to resist corrosion by the electrolyte and provide good mechanical adhesion to the aerogel. Suitable metals include titanium, nickel, tantalum or alloys such as titanium-tungsten.

Noncorrosive solder-wettable metal layers 32, 36 such as gold or copper are deposited on top of the adhesion metal layers 30, 34. Layers of solder-wettable metal of about 1000 Å or more may be deposited according to similar techniques described in connection with the adhesion metal layers.

Positioned between the cells is a highly electrically conductive cell separator 24 that prevents ionic flow but permits electrical conduction between the electrodes. The cell separator 24 is preferably lightweight and has low density in order to minimize its weight contribution to the supercapacitor. In a preferred embodiment, shown in FIG. 2A the cell separator 24 is in the form of an o-ring having an outer diameter 24a larger than the diameter of the disk-like electrodes 22, 26 and an inner diameter 24b smaller than the diameter of the electrodes. The o-ring thickness should be as thin as possible. The composition of the cell separator is desirably such that it is electrically conductive, but is stable chemically with respect to the electrolyte. Suitable cell separators may consist of metals, conductive rubbers or plastics, nonporous carbon or metal-plastic composites.

FIG. 2A illustrates an expanded view of portions of the two cells 10, 12 to provide further detail. In addition to the elements shown in FIG. 1B, cell 12 includes an electrode separator 40 which separates electrode 26 from the second electrode (not shown) in the cell 12. A portion of solder 42 is deposited on solderwettable layer 36 which is formed on electrode 26. The volume of solder 42 should be less than that formed by the inner diameter 24b of cell separator 24.

As an additional protection against ionic conduction between the electrodes via the electrode separator, the electrode separator may be hermetically sealed against the electrodes. Depending on the composition of the electrode separator, the hermetic seal may be formed by conventional methods, such as compression sealing. Alternatively, for a electrode separator consisting of metal-plastic composite, the separator may be integrated with an electrode by heating to create the seal. Specifically, integration with the electrodes is achieved by heating until the melted thermoplastic flows and physically connects both electrodes. The melted thermoplastic seals the electrodes to ionically isolate them from one another without disturbing electrical conductivity.

The selection of the solder should take into account the composition of the thermoplastic selected as the cell separator. For example, for an cell separator composed of polypropylene, melting point approximately 138° C., a lead/tin alloy solder melting at about 160° C. may be suitable so that unnecessary heating is avoided. Melted solder flows in the well in cell separator 24 formed by inner diameter 24b and connects the second electrode 26 with the cell separator 24 via solderwettable layer 36 and adhesive layer 34, so that electrical contact between the electrodes is established.

By repeating these steps, additional cells composed of electrodes with similar layers, separators and electrical contacts may be created in order to form a multicell stack 50 (FIG. 2B) that may be joined together for a high energy density supercapacitor device. The individual cells may have electrical contacts prepared according to any of the previous embodiments. The intracell seal created by the electrode separator 40 helps prolong the life of the device by preventing corrosion of the solder by the electrolyte since ionic conduction through the aerogel is prevented.

In such a stack, individual capacitor electrodes are electrically isolated from one another by an electrically nonconductive, but ionically conductive electrode separator 40, as illustrated in FIGS. 2A and 1B. Electrical nonconductivity is essential in order to maintain intracell voltage differences. In addition, the electrode separator 40 must be chemically stable with respect to the electrolyte and sufficiently porous to facilitate ionic conduction, a major component of the internal supercapacitor resistance. Suitable electrode separator materials include polypropylene, TEFLON™ (commercially available from DuPont Company), nylon, and glass fiber filter papers.

Stacking of individual capacitor cells may be performed before or, after the electrolyte is introduced into the cells. Introduction after stacking is preferred in order to avoid degrading the electrolyte while heat is applied during the sealing procedure used to join cells in a multilayer stack.

Before introducing the electrolyte, it is important to ensure that neither oxidizable nor reducible gases are dissolved in the electrolyte in order to minimize the device's self-discharge rates promoted by their presence. Removal of these gases may be achieved by bubbling a nonreducible, nonoxidizable gas through the electrolyte solution to strip the oxidizable and/or reducible dissolved gases from the solution.

After these dissolved gases are removed, the electrolyte is injected into the cells by means known to the art. For example, the supercapacitor may be secured in a jig which is in turn immersed in the electrolytic fluid. For example, under vacuum, the electrolyte fills the pores of the aerogel, separators and other voids. Surfactants in the electrolyte may be used to facilitate the introduction of some electrolytes into the aerogel and may enhance the capacitance of the supercapacitor.

Once a cell or stack of cells is prepared, enclosure of the cell or cells is necessary to protect the capacitor system from the environment. FIG. 2B illustrates a capacitor having a multicell stack 50 enclosed in a cylindrical environmental seal 52. The stack 50 is terminated with electrical contacts 54, 56, according to any of the materials and methods described above. The environmental seal 52 allows electrical contact to be established to an external power source, not shown. Formation of the environmental seal 52 may be accomplished in several ways. For example, a cell or multicell stack may be inserted into a hot sealing cylinder that applies heat to create mechanical seals between the melted and protruding edges of adjacent thermoplastic o-rings 58, 60, illustrated in FIG. 2A. Or, more simply, pressure may be applied to the stack to form a compression seal between the o-rings. Alternatively, the cells may be enclosed in a c-shaped thermoplastic form which is sealed to form a cylindrical environmental seal using a melted bead of thermoplastic. A supercapacitor is thereby formed and is ready for charging.

Preparation of Carbon Aerogels

The process in general requires first that the reactants are mixed with a catalyst and may include the addition of metals. The reactants include resorcinol, phenol, catechol, phloroglucinol, and other polyhydroxybenzene compounds that react in the appropriate ratio with formaldehyde or furfural. Preferred combinations include resorcinol-furfural, resorcinol-formaldehyde, phenol-resorcinol, formaldehyde, catechol-formaldehyde, and phloroglucinol, formaldehyde. Preferred combinations include resorcinol-furfural, resorcinol-formaldehyde, phenol-resorcinol-formaldehyde, catechol-formaldehyde, and phloroglucinol-formaldehyde. A gel formed by polymerization is then dried in a solvent exchange and extraction step. The resulting organic aerogel is then pyrolyzed in an inert atmosphere to form a carbon aerogel. Specifically, the process to prepare the gels of the present invention proceeds through a sol-gel polymerization of certain multifunctional organic monomers in a solvent, typically water, leading to the formation of highly crosslinked, transparent gels. For example, in a preferred embodiment, one mole of resorcinol (1,3-dihydroxybenzene) condenses in the presence of a basic catalyst with two moles of formaldehyde. Mildly basic catalysts such as sodium carbonate are preferred. In this polymerization, resorcinol is a trifunctional monomer capable of adding formaldehyde in the 2-, 4-, and/or 6-ring positions. The substituted resorcinol rings condense with each other to form nanometer-sized clusters in solution. Eventually, the clusters crosslink through their surface groups (e.g., —$CH_2OH$) to form an aquagel. A full discussion of the chemistry is not provided here since the specific details are described in depth in U.S. Pat. Nos. 4,997,804 and 4,873,218, hereby incorporated by reference.

Figure 6:
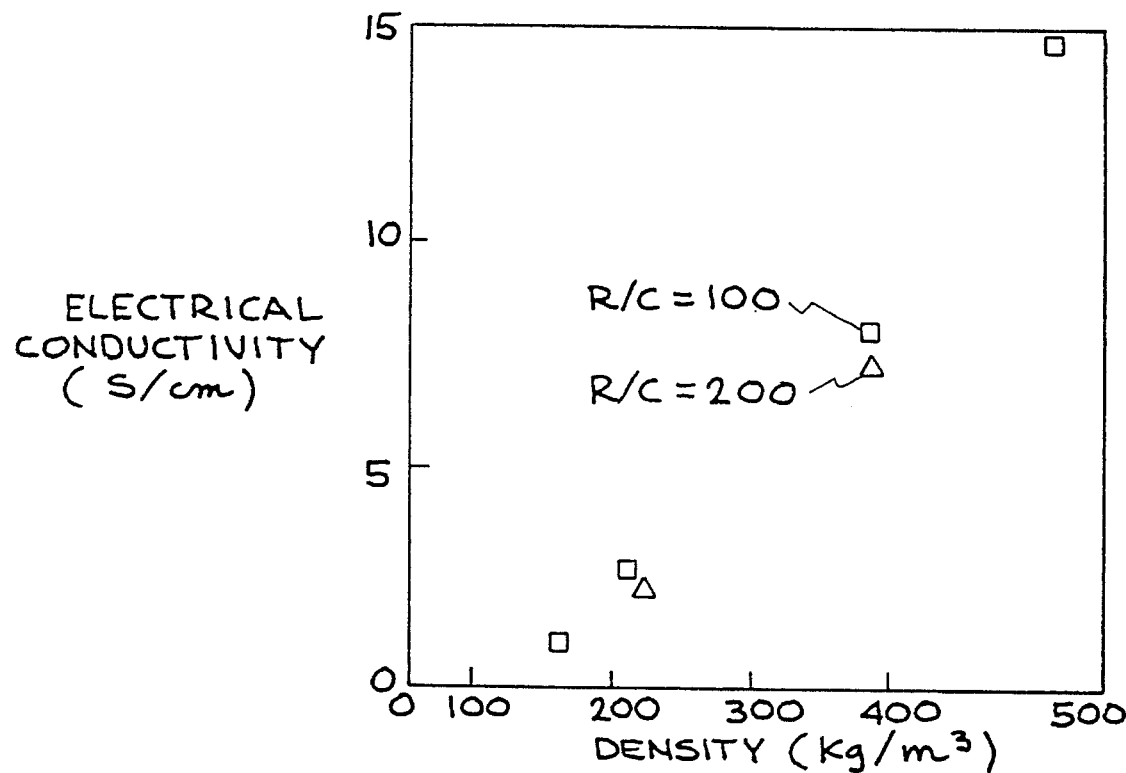
FIG. 6 is a graph illustrating the electrical conductivity of carbon foams according to the present invention.

The size of the clusters is regulated by the concentration of catalyst in the resorcinol-formaldehyde (RF) mixture. More specifically, the mole ratio of resorcinol (R) to catalyst (C), R/C, controls the surface area and electrochemical properties of the resulting gel. For example, as illustrated in FIG. 6, in gels having R/C of 100 and 200, electrical conductivity of the gels increases significantly with increasing density.

RF aquagels (and aerogels) are typically dark red in color, and transparent because of the extensive network of small pores that are much smaller than the wavelength of visible light. The densities of these gels are between about 0.1 g/cc to about 0.6 g/cc.

The next step in aerogel preparation is to dry the aquagel. If the polymerization solvent is removed from these gels by simple evaporation, large capillary forces are exerted on the pores, forming a collapsed structure known as a xerogel. In order to preserve the gel skeleton and minimize shrinkage, it is preferable to perform the drying step under supercritical conditions. The highly porous material obtained from this removal operation is known as an aerogel. By appropriate adjustment of drying conditions, a hybrid structure having characteristics of both a xerogel and an aerogel may be produced. For example, such a hybrid may be produced as a result of a partial evaporation of the gel solvent under conditions promoting xerogel formation followed by evaporation of the remaining solvent under conditions promoting aerogel formation. The resulting hybrid structure would then be dried under supercritical conditions and pyrolyzed. Preparation of other xerogel-aerogel hybrids may be produced by first evaporating under conditions promoting aerogel formation and completing the evaporation under xerogel-promoting conditions. The thus formed aerogel, xerogel, and xerogel-aerogel hybrid foams when pyrolyzed have a density of between 0.1 g/cc to 1.2 g/cc and a surface area of between about 100 $m^2/g$ to about 1200 $m^2/g$.

One means for removing water from the water-based aquagel to form an organic aerogel is by extraction of the gel with a relatively lower surface tension fluid such as carbon dioxide. Because water is immiscible with liquid $CO_2$, the aquagels are first exchanged with an organic solvent such as acetone and then slowly dried inside a temperature-controlled pressure vessel. The critical point of carbon dioxide ($T_c=31°$ C.; $P_c=7.4$ MPa) is low enough to facilitate its removal without degrading the gel structure. The time required for supercritical drying depends on the thickness of the gel.

In cases where the gels are of sufficiently high density, such as greater than about 40 wt % solids, the pore network may have sufficient inherent strength to withstand the drying process without resort to supercritical drying conditions. Thus, carbon dioxide may be bled from the vessel under nonsupercritical conditions. Nonsupercritical drying is particularly attractive because of reduced processing time.

To maximize crosslinking and further increase the density of the gels, a cure cycle may be desired.

Figure 7:
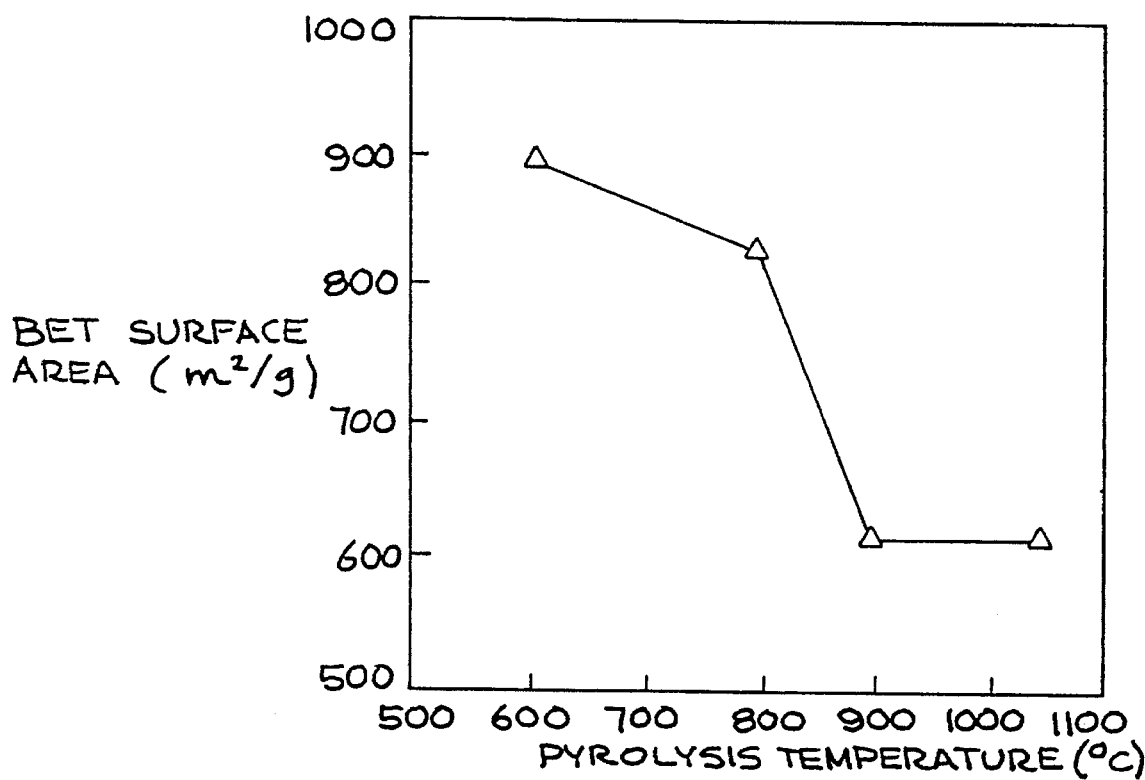
FIG. 7 is a graph illustrating the variation of surface area with pyrolysis temperature for the carbon foams according to the present invention.

Following the solvent exchange/extraction step and any cure cycle, the organic aerogel is typically pyrolyzed at elevated temperatures about 1050° C. in a conventional inert atmosphere of nitrogen, argon, neon or helium to form carbon aerogels. Other pyrolysis temperatures (600–2100° C.) can be used to alter the surface area and structure of the carbon aerogel. For example, FIG. 7 shows how the BET surface area, as measured by nitrogen gas adsorption, varies with pyrolysis temperature. In particular, higher surface areas are achieved at lower temperatures. The resulting aerogels, independent of the procedure by which they are pyrolyzed, are black and no longer transparent due to the visible absorption properties of the carbon matrix.

Although the aerogels produced according to the present invention have suitably high electrical conductivities to be useful as electrodes in the supercapacitor of the present invention, sometimes it may be desired to further increase their electrical conductivities. One means by which this may be accomplished is to reduce the resistance of an aerogel electrode by incorporating electrically conductive materials into the aerogel during its preparation. Any electrically conductive material stable in the electrolyte, including metals like tungsten, may be suitable as long as the material does not disturb the other chemical or physical characteristics necessary to produce an adequate aerogel material.

The preparation of several gels according to the above-described process is described in the following Examples.

Gel Preparation

EXAMPLES 1–3

Resorcinol-formaldehyde-based (RF) gels with varying R/C ratios were prepared. The reactants were added to a 250 ml beaker in the order listed in Table 1 and then mixed until a clear, homogeneous solution was formed. The sodium carbonate catalyst was then added. The solution was then cast in molds, e.g., glass vials. The gels were cured according to the following cycle: 24 hours at room temperature, followed by 24 hours at 50° C., and 72 hours at 95° C. Densities of the resulting aerogels were about 0.3–0.4 g/cc.

A catechol-formaldehyde-based gel using the reactants listed below was prepared and cured according to the procedure used in Examples 1–3. The density of the resulting aerogel was about 0.4 g/cc.

TABLE 1

| Reactants (g) | |
| --- | --- |
| catechol (R') | 12.35 |
| formaldehyde (37%) | 17.91 |
| deionized and distilled $H_2O$ | 15.30 |
| sodium carbonate, 0.1$\underline{M}$ (C) | 5.58 |
| R'/C | 200 |

Solvent Exchange

EXAMPLE 5

Upon completion of the cure cycle, the gels prepared in Examples 1 through 4 were removed from their molds and placed in an organic solvent, e.g., acetone. During a first wash, trifluoroacetic acid was usually added to the solvent at a concentration of $\leq 0.1$ wt. % to promote additional crosslinking of the gels. With agitation, the solvent diffused into the gels, replacing the water occupying the gel pores. After several additional exchanges with fresh acetone, the pores were completely filled with the organic solvent and the gels were ready for supercritical extraction.

Supercritical Extraction

EXAMPLE 6

Acetone-filled gels prepared according to Examples 1 through 5 were placed in open glass containers and covered with additional acetone to ensure the gels were submerged. Submersion in the solvent was necessary throughout the extraction process to ensure that the gels did not crack. The containers were then placed in a jacketed pressure vessel. Trapped air was slowly bled from the vessel as the vessel was filled with liquified carbon dioxide at ~900 psi and a jacket temperature of 14° C. The jacket temperature was controlled to $\pm 0.5°$ C. with a circulating bath containing a 50/50 solution of ethylene glycol/water.

The gels were allowed to stand in the liquified carbon dioxide for a minimum of 1 hour. After this initial induction period, the vessel was flushed with fresh carbon dioxide for approximately 15 minutes. The carbon dioxide was then drained from the vessel to a level just above the crosslinked gels. The vessel was then refilled with liquified carbon dioxide. The drain/refill procedure was conducted at least six times daily. In this process, diffusion is solely responsible for the displacement of acetone from the pores of the gel, by carbon dioxide. Generally, 2 days of the drain/refill procedure were required to completely displace the acetone with carbon dioxide.

In preparation for supercritical drying [$T_c=31°$ C.; $P_c=1100$ psi], the carbon dioxide level was drained to a level just above the gels. All valves to the pressure vessel were then closed and the vessel was heated to 50° C. At this temperature, a pressure of 1800 psi was usually recorded. The pressure vessel was held at these conditions for a minimum of 4 hours, after which time the pressure was slowly reduced by bleeding over a period of 8 hours while maintaining the jacket temperature at 50° C. The resulting material was an organic aerogel.

The aerogels produced according to the abovedescribed process and Examples have continuous porosity, ultra-fine pore sizes (less than 100 nanometers (nm)), high surface areas (400 to 1000 $m^2/g$) and a solid matrix composed of interconnected colloidal-like particles or polymeric chains with characteristic diameters of 10 nm. However, the properties of such aerogels may be tailored further according to the desired use by adjusting process parameters. For example, the density of the gels may be adjusted by altering the polymerization and/or drying conditions to affect solid volume fraction and/or pore size. As discussed above, electrical conductivity may increased by the introduction of electrically conductive materials. In addition, aerogel surface area and functionality can also be increased through the proper selection of purge gases employed during the pyrolysis cycle. Oxidizing gases such as carbon dioxide and air can be slowly purged through a tube furnace at 600°–1200° C. to activate the aerogel or alter the reactivity/functionality of the aerogel surface area. While this activation process is used commonly to activate powdery carbon blacks, it is not typically used to activate bulk materials such as carbon aerogel monoliths.

In summary, the capacitor according to the present invention achieves very high energy density by incorporation of high density carbon aerogel electrodes and utilization of lightweight packaging techniques. Specific capacitance is increased substantially compared to conventional capacitance devices. One or more cells may be connected in series to achieve high voltage stacks.

INDUSTRIAL APPLICABILITY

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A foam selected from the group consisting of aerogel carbon foam, xerogel carbon foam, and xerogel-aerogel hybrid carbon foam, and derived from the pyrolysis of mixtures consisting of resorcinol-furfural, resorcinol-formaldehyde, phenol-resorcinol-formaldehyde, catechol-formaldehyde, and phloroglucinol-formaldehyde;

said foam having a density of greater than 0.3 g/cc to about 1.2 g/cc and a surface area of between about 100 $m^2/g$ to about 1200 $m^2/g$.

2. The foam of claim 1, additionally including an electrically conductive additive.

3. The foam of claim 1, additionally including a formatted carbon matrix.

4. The foam of claim 1, additionally including electroactive surface groups.

5. The foam of claim 1, additionally including an activated carbon matrix.

6. The foam of claim 1, additionally including a carbon matrix having electroactive surface groups.

7. The foam of claim 1, produced by a process which includes;

forming a gel by polymerization of one of the mixtures;

exchanging the gel with a solvent under nonsupercritical temperature and pressure conditions;

extracting the gel under nonsupercritical temperature and pressure conditions to form an aerogel; and pyrolyzing the aerogel to produce a carbon foam.

* * * * *